UNITED STATES PATENT OFFICE.

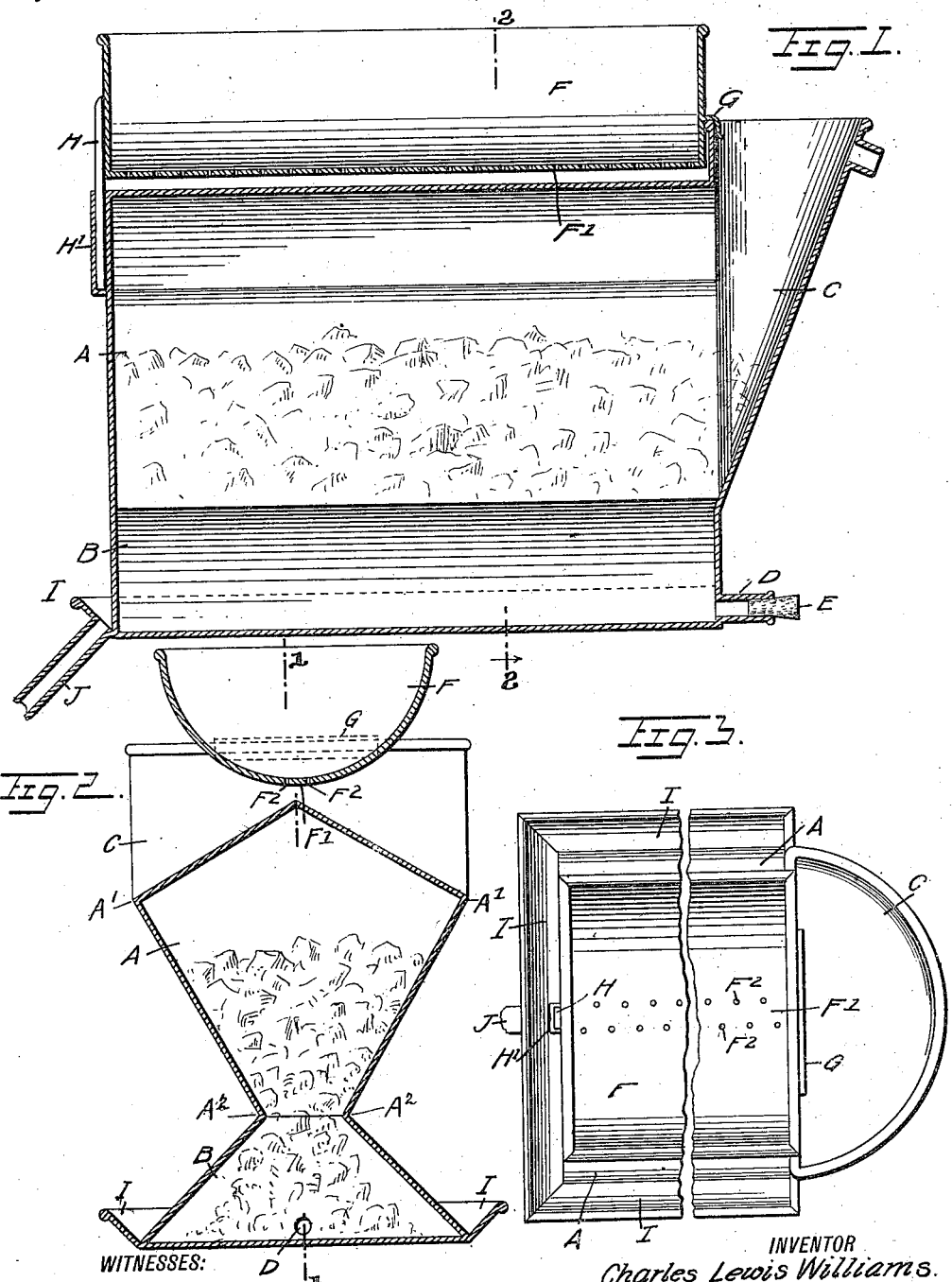

CHARLES LEWIS WILLIAMS, OF LAURENS, NEW YORK, ASSIGNOR, BY MESNE ASSIGNMENTS, TO IDEAL AERATOR COMPANY, INC., A CORPORATION OF NEW YORK.

AERATOR AND COOLER.

1,269,143.     Specification of Letters Patent.     Patented June 11, 1918.

Application filed April 29, 1915, Serial No. 24,689. Renewed April 30, 1918. Serial No. 231,747.

*To all whom it may concern:*

Be it known that I, CHARLES LEWIS WILLIAMS, a citizen of the United States, and a resident of Laurens, in the county of Otsego and State of New York, have invented a new and Improved Aerator and Cooler, of which the following is a full, clear, and exact description.

The object of the invention is to provide a new and improved aerator and cooler, more especially designed for use by dairymen for aerating and cooling cream and milk, and which is simple and durable in construction, composed of but few parts not liable easily to get out of order, and which is sanitary and provides a large cooling surface in a comparatively small space, and requires no skilled labor in attending to the apparatus.

In order to accomplish the desired result, use is made of a receptacle adapted to contain a cooling medium, the said receptacle having an upper compartment of an approximately diamond shape in cross section, and a lower compartment of approximately triangular shape, the apex of the lower compartment being in communication with the bottom of the upper compartment, a distributing trough mounted on top of the said receptacle and having a perforate bottom extending a short distance above the apex of the upper compartment, and a collecting trough extending upwardly and outwardly on the bases of the sides and one end of the lower compartment.

A practical embodiment of the invention is represented in the accompanying drawings forming a part of this specification, in which similar characters of reference indicate corresponding parts in all the views.

Figure 1 is a sectional side elevation of the aerator and cooler on the line 1—1 of Fig. 2;

Fig. 2 is a transverse section of the same on the line 2—2 of Fig. 1; and

Fig. 3 is a plan view of the same with the middle portion broken away.

The aerator and cooler in its general construction consists of an upper compartment A and a lower compartment B, of which the upper compartment A is approximately diamond-shaped in cross section while the lower compartment B is approximately triangular and is in communication at the apex with the lower end of the upper compartment A, as plainly shown in Fig. 2. One end of the upper compartment A is provided with an upwardly and sidewise extending filling chute C having its upper end extending a distance above the apex of the upper compartment A. Cracked or crushed ice can be readily passed into the chute C from which the ice passes into the upper compartment A to fill the same and some of the ice may pass into the lower compartment B, but the latter mostly contains the ice water incident to the melting of the ice and this ice water can be withdrawn from time to time through a suitable outlet spout D arranged on one end of the lower compartment B and normally closed by a cork or other plug E.

Directly above the apex of the upper compartment A is arranged a distributing trough F having a perforate bottom $F'$ spaced a short distance from the apex of the upper compartment A. Two rows of perforations $F^2$ are preferably arranged in the bottom $F'$ and the said rows of perforations are on opposite sides of the apex of the compartment A so that the cream or milk contained in the distributing trough F passes through the perforations $F^2$ and onto the opposite top sides of the compartment A to flow down the same and finally over the bottom sides thereof onto the sides of the lower compartment B. One end of the distributing trough F is provided with a hook G adapted to hook onto the top of the spout C, and the other end of the distributing trough F is provided with a bar H extending downwardly and engaging a socket $H'$ arranged on the corresponding side of the upper compartment A. By the arrangement described, the distributing trough F is removably supported above the apex of the upper compartment A for the purpose above mentioned.

The cream or milk on reaching the bases of the sides of the lower compartment B passes into a receiving trough I, the outer wall of which extends upward and outward and this trough extends throughout the length of the sides and also along the end of the compartment B opposite the one having the outlet spout D previously mentioned. A pipe J leads from the end of the trough I to a suitable receptacle into which passes the aerated and cold milk.

In using the aerator and cooler the cream or milk is poured into the distributing trough F from which the cream or milk passes by way of the rows of perforations F² onto the top sides of the upper compartment A to flow down the said top sides and then over the bottom sides of the said compartment and finally over the sides of the lower compartment B to finally reach the trough I from which the cooled or aerated milk passes by way of the pipe J to a suitable receptacle. Now it will be noticed that as the compartments A and B contain a cooling medium the cream or milk is quickly cooled by passing over the sides of the said compartments A and B and at the same time the cream and milk is aerated during its flow over the sides of the said compartments.

By the arrangement described a large aerating and cooling surface is provided in a comparatively small space and the apparatus can be readily set on a floor or bench, and the distributing trough F can be readily removed for cleaning purposes so as to keep the apparatus at all times in proper sanitary condition.

It will also be noticed that the downward flow of the milk or cream is somewhat retarded on reaching the sharp corners A' and A² thus holding the milk or cream a long time in contact with the cooling and aerating surfaces. By arranging the filling chute C and outlet D as shown and described the apparatus can be readily refilled with ice at any time without interrupting the aerating and cooling operation of the milk or cream.

Having thus described my invention, I claim as new and desire to secure by Letters Patent:

An aerator and cooler, comprising a receptacle adapted to contain a cooling medium, the said receptacle having an upper compartment of an approximately diamond shape in cross section and a lower compartment of an approximately triangular shape, the apex of the lower compartment being in communication with the bottom of the upper compartment, a filling spout extending upwardly and sidewise from one end of the said upper compartment for filling the latter with crushed ice, a distributing trough removably mounted on top of the said receptacle with its bottom extending a short distance above the apex of the upper compartment, said trough being U-shape in cross section having two rows of perforations in bottom, one at each side of the center of the trough and adjacent thereto and a collecting trough extending upwardly and outwardly from the base of the lower compartment on the sides and the end opposite the filling spout.

In testimony whereof I have signed my name to this specification in the presence of two subscribing witnesses.

CHARLES LEWIS WILLIAMS.

Witnesses:
   STEWART C. MILLARD,
   LINN A. MAPLES.